United States Patent [19]

Salzer

[11] 4,045,719
[45] Aug. 30, 1977

[54] REGULATED VOLTAGE SOURCE

[75] Inventor: William Ellsworth Salzer, Margate, Fla.

[73] Assignee: RCA Corporation, New York, N.Y.

[21] Appl. No.: 695,985

[22] Filed: June 14, 1976

[51] Int. Cl.² ............... H02M 7/217; G05F 1/56
[52] U.S. Cl. ........................... 363/89; 307/108; 307/246; 323/22 T
[58] Field of Search ............ 321/2, 15, 18, 43; 307/109, 110, 296, 297, 246, 108, 107, 106, 127; 323/17, 227, DIG. 1

[56] References Cited
U.S. PATENT DOCUMENTS

| | | | |
|---|---|---|---|
| 3,821,627 | 6/1974 | Milovancevic | 321/2 |
| 3,878,450 | 4/1975 | Greatbatch | 307/110 |
| 3,944,908 | 3/1976 | Oki | 321/15 |
| 3,962,591 | 6/1976 | Popka | 321/15 |

Primary Examiner—Gerald Goldberg
Attorney, Agent, or Firm—H. Christoffersen; S. Cohen; A. L. Limberg

[57] ABSTRACT

A circuit for deriving an output voltage of a first polarity from a signal source which produces a voltage whose value fluctuates between a reference level and a level opposite in polarity to said output voltage. Disclosed are provisions for maintaining the output voltage relatively constant despite variations in both load current and the peak output voltage of the signal source.

12 Claims, 3 Drawing Figures

REGULATED VOLTAGE SOURCE

A requirement often exists for a source of voltage having a given polarity for supplying small values of current in circuits where the major current requirements are satisfied by a voltage source of the opposite polarity. For example, many semiconductor memory systems utilizing metal-oxide-semiconductortransistors have most of their current supplied by a positive voltage source. A voltage of the opposite polarity is required only for substrate bias. This latter application demands very little current. Additionally, where transistors are used as switching devices, it is known that when these devices are biased from a source of a given polarity, the switching speeds of these transistors may be increased by applying a voltage of polarity opposite that of the power source to the base electrodes of these devices when it is desired to switch them off. This too is an application having a low current requirement.

It is highly desirable in an electronic system to be able to generate voltage for such low current applications without requiring such modifications to the system power supply as an additional winding on the power transformer and additional rectifier and regulator circuits. The circuit of the present invention is supplied with input pulses of a first polarity and produces in response thereto a direct voltage of opposite polarity. Means are included for maintaining this direct voltage level relatively constant even though the load current or the amplitude of the input pulses may vary.

In the drawing, wherein corresponding elements have been given like reference designations:

Figure 1:
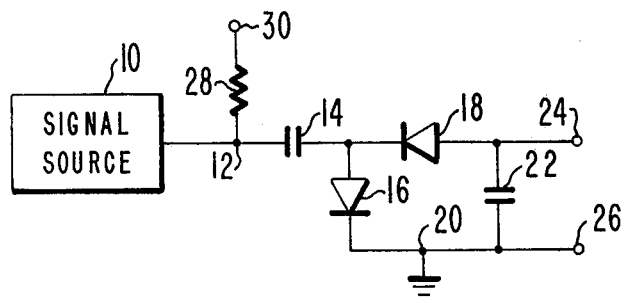
FIG. 1 is a schematic circuit diagram of a known voltage source.

The circuit of FIG. 1 is a power supply circuit known in the art (see "IC Oscillation Sets Up a Mini-Sized Bias Supply" by James Kotas, ELECTRONICS, July 6, 1970, pg. 76). Source 10 is a source of unipolar pulses varying in amplitude between a value at or near the reference potential and a positive voltage V. This source may represent an oscillator circuit known in the art such as a plurality of NAND gates connected in a loop to form an astable multivibrator. Alternatively in a logic system, the desired pulses may be obtained from the memory system timing generator. In the latter case, source 10 may only comprise a driver element for coupling these pulses to input node 12.

In the operation of the circuit of FIG. 1, when the output of source 10 is relatively high, capacitor 14 charges to the peak pulse voltage V minus the forward diode voltage drop of diode 16. The charging direction is such that the relatively positive terminal of this capacitor is the one connected to node 12. When the output of source 10 drops to its low value, capacitor 14 is effectively placed across diode 16, thereby reverse biasing it and cutting it off. During this interval, capacitor 14 discharges through diode 18 into capacitor 22. The charging direction of capacitor 14 is such that its relatively positive terminal is the one connected to terminal 26. An output voltage is produced at terminal 24 that is negative with respect to ground. This output voltage, once capacitor 22 is charged to its maximum attainable voltage, essentially equals the voltage across capacitor 14 minus the forward diode voltage drop of diode 18. Resistor 28 is a pull-up resistor that enables the capacitor 14 to charge to the maximum available pulse voltage, thereby increasing the magnitude of the output voltage.

One disadvantage of the circuit of FIG. 1 is that the value of the output voltage fluctuates in amplitude if the load current or the amplitude of the pulse supplied by source 10 varies. Additionally, for a given input pulse amplitude, little freedom exists in the choice of an outputvoltage value.

Figure 2:
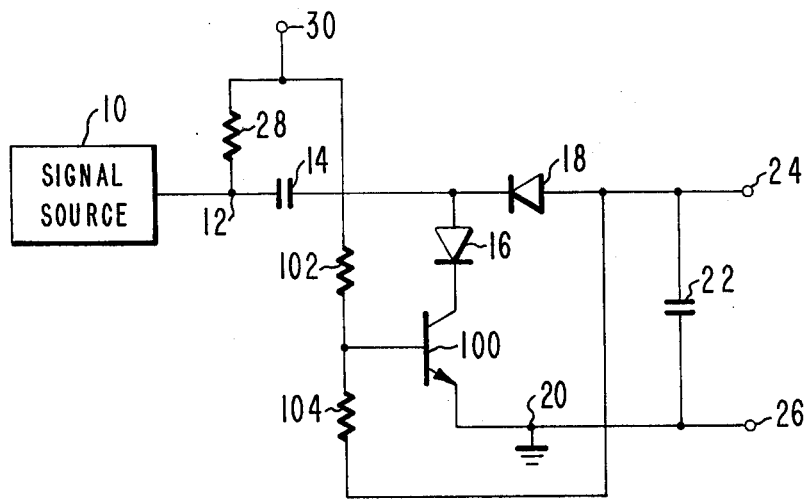
FIG. 2 is a schematic circuit diagram of an embodiment of the invention.

These problems above are minimized in the embodiment of the invention illustrated in FIG. 2. This circuit includes a number of the elements of FIG. 1 and additional elements as follows. An NPN transistor 100, which is added to the circuit of FIG. 1, is connected at its collector to the cathode of diode 16 and at its emitter to node 20. FIG. 2 also includes resistor 102 connected between terminal 30 and the base of this transistor and resistor 104 connected between the base and output terminal 24. All other connections are unchanged from the circuit of FIG. 1.

In the operation of the circuit, assume initially that both capacitors are uncharged. Upon energization of source 10 and the application of a voltage at terminal 30, transistor 100 is driven into saturation by current supplied through resistor 102. During the first pulse interval, capacitor 14 charges through the path which includes the collector-emitter path of this transistor. During the interpulse interval, when the input voltage at node 12 drops to zero, the charge on capacitor 14 is partially transferred to capacitor 22, causing the voltage at terminal 24 to increase in a direction that is negative with respect to ground. The amount of charge transferred between capacitors during each interpulse interval is a function of their relative capacitance values.

The voltage at terminal 24 is coupled to the base of transistor 100 by feedback resistor 104. As the voltage at terminal 24 becomes more negative, th base of this transistor becomes less positive with respect to its emitter. The output voltage ultimately reaches a value which causes transistor 100 to become cut off. At this point, circuit equilibrium is reached. The charging path of capacitor 14 is interrupted and the further charging of this capacitor is inhibited. As a result, the output voltage ceases to increase in magnitude. The value of output voltage that causes transistor 100 to cut off is primarily determined by the values of resistors 102 and 104 and the value of the voltage applied to terminal 30. The desired value of output voltage may be realized by an appropriate selection of the above parameters. Experimental results indicate that the output voltage magnitude may range from a value near ground level to approximately 75% of the peak pulse amplitude. The voltage at terminal 30 should be at least as large as the pulse amplitude. A degree of freedom therefore exists, with respect to the selection of the desired value of output voltage, in the circuit of FIG. 2 that is not present in the circuit of FIG. 1.

For the condition of circuit equilibrium, no further charging of capacitors 14 and 22 occurs (leakage currents associated with these elements are assumed to be negligible). When current is drawn by load means (not shown) connected between output terminals 24 and 26, capacitor 22 discharges at least partially. As a result, the voltage at terminal 24 becomes less negative with respect to terminal 26. This voltage "increase" causes transistor 100 to conduct thereby enabling charging of capacitor 14. Charge is then transferred between capacitors 14 and 22, restoring the output voltage to its desired value.

Regulation of the output voltage is also attained with respect to variations in the amplitude of the pulses supplied by source 10. For example, if it is necessary to supply charge to capacitor 22 and the amplitude of the pulses supplied to terminal 12 decreases, feedback resistor 104 simply permits transistor 100 to conduct for the time necessary for capacitor 14 to receive sufficient charge to restore the output voltage to the desired value. In an analogous manner, the circuit of FIG. 2 compensates for increases in the amplitude of the input pulses.

In one embodiment of the invention, the following component values were utilized:

Resistor 28: 1.0 Kohm
Resistor 102: 11.3 Kohm
Resistor 104: 5.6 Kohm
Capacitors 14, 22: 0.2 μfarad With +12 volts applied at terminal 30 an output voltage of −5 volts was obtained when a 500Khz signal was applied at node 12.

It should be appreciated that the output voltage may not be maintained at a level having absolutely no amplitude fluctuations. This is due, in part, to the fact that a change in the voltage present at terminal 24 is not directly applied to the base of transistor 100 but is instead reduced by the ratio of the voltage divider comprising resistor 102 and 104 of FIG. 2. Another small error may be cause by the finite base current flow of transistor 100. This current flow affects the value of the voltage present at the base of transistor 100.

Figure 3:
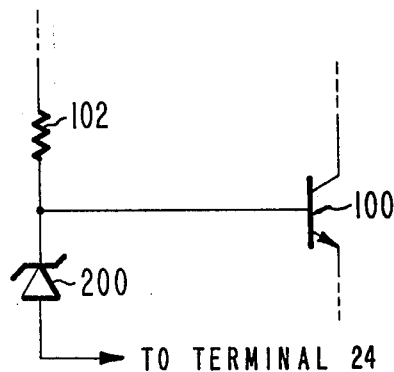
FIG. 3 is a modification of a portion of the circuit of FIG. 2.

The above described problems may be minimized by the use of the circuit of FIG. 3. In this Figure, resistor 104 is removed from the circuit of FIG. 2 and is replaced by a threshold conduction device such as Zener (or avalanche) diode 200. All other connections are unchanged from the circuit of FIG. 2. Using a Zener diode as the feedback element ensures that virtually all of the output voltage variations are coupled to the base of transistor 100. There is no appreciable reduction in this voltage as there is when a resistive feedback element is used. In addition, the low dynamic impedance of this diode reduces the effect of base current on the potential at the base of transistor 100. The circuit of FIG. 3 therefore provides better regulation than does the circuit of FIG. 2 but at the added expense of the cost of a Zener diode as compared to the cost of a resistor.

The circuits of FIGS. 2 and 3 may be used to supply voltage to a plurality of printed circuit board assemblies in an electronic system. Alternatively, because of their relative simplicity and small size, the circuits may be utilized in discrete or integrated circuit form on individual assemblies, where required. The latter approach simplifies the power suppy distribution system. It should be appreciated that a positive voltage may be derived from a pulse train having a negative peak value by, in accordance with the teachings of the present invention, reversing the directions of conduction of diodes 16 and 18, the polarity of the voltage at terminal 30 and the conductivity type of transistor 100. In addition, bipolar transistor 100 may be replaced by other devices having the desired switching characteristics such as a transistor of the field effect type or a thyristor device such as a programmable unijunction transistor (PUT).

What is claimed is:

1. A voltage source comprising, in combination:
   first and second charge storage means, each having respective first and second terminals;
   controlled conductance means directly responsive to a control potential for providing a controlled unilateral conductance through a path between first and second terminals thereof, the first terminal of said controlled conductance means being joined via an interconnection to the first terminal of said first charge storage means;
   a source of changing voltae signals connected between the second terminals of said first charge storage means and said controlled conductance means for supplying charge to said first charge storage means through said controlled conduction means on excursions of said voltage signals of a sense to cause conduction through its controlled unilateral conductance;
   means for transferring charge from said first to said second charge storage means during intervals when said first charge storage means is not being supplied charge, thereby developing an output voltage across said second charge storage means; and
   means for applying said output voltage as control potential to said controlled conductance means, for inhibiting the charging of said first charge storage means whenever the magnitude of said voltage is greater than a predetermined level and for enabling the charging of said first charge storage means whenever the magnitude of said voltage is less than said predetermined value.

2. A voltage source as claimed in claim 1 wherein the path through said controlled conduction means includes a first diode, for causing said path to be unilaterally conductive.

3. A voltage source as claimed in claim 1 wherein said means for transferring charge includes a second diode connected between the first terminal of said second charge storage means and the interconnection through which the first terminals of said first charge storage means and said controlled conductance means are joined, and wherein the second terminal of said charge storage means is referred in potential to the second terminal of said first charge storage means.

4. The combination as set forth in claim 1 wherein said first and second charge storage means each comprise a capacitor.

5. A voltage source comprising in combination:
   first and second charge storage means;
   a signal source having a terminal, at which a voltage ranging between first and second levels may be obtained, connected to one terminal of said first charge storage means;
   a first diode, connected to a second terminal of said first charge storage means, said first diode poled to be reverse biased whenever said signal source voltage is at said first level;
   means for transferring charge from said first to said second charge storage means during intervals when said first charge storage means is not being supplied charge, thereby developing an output voltage across said second charge storage means;
   a feedback element; and
   a voltage controlled switch having a conduction path for selectively completing a series connection including said first diode and said first charge storage means between said signal source terminal and a point at a reference potential, said voltage controlled switch having a control electrode connected to a point at said output voltage by said feedback element; said switch inhibiting the charging of said first charge storage means whenever the magnitude of said output voltage is greater than a predetermined level and enabling the charging of said first charge storage means whenever said magnitude of said output voltage is less than said predetermined value.

6. The combination as set forth in claim 5 wherein said feedback element comprises a resistance.

7. The combination as set forth in claim 5 wherein said feedback element comprises a threshold conduction device.

8. The combination as set forth in claim 5 wherein said switch comprises a bipolar transistor having base electrode and emitter and collector electrodes defining a path therebetween, said base electrode comprising said control electrode and said path between said emitter and collector electrodes comprising said conduction path.

9. A circuit for deriving an output voltage level from a source of spaced unipolarity signals comprising, in combination:
  an input terminal to which said source may be connected and an output terminal;
  a first capacitance connected at one terminal to said input terminal
  first and second diode means, the first connected in the forward direction relative to signals supplied by said source between the other terminal of said capacitance and a circuit node, and the other connected in the reverse direction relative to said signals between the other terminal of said capacitance and said output terminal;
  a second capacitance connected between said output terminal and a point at a reference potential; and
  means responsive to the voltage at said output terminal for closing the path between said circuit node and a point at said reference potential, whenever said voltage is lower than a given value, whereby said first capacitance charges in response to said spaced signals and discharges into said second capacitance during the periods between said signals, and for opening said path whenever said voltage reaches said given value.

10. The combination as set forth in claim 9 wherein said means for closing the path comprises a voltage controlled switch having a conduction path and a control electrode, said conduction path connected between said circuit node and said point at said reference potential and said control electrode connected to said output terminal.

11. The combination as set forth in claim 10 wherein said switch comprises a bipolar transistor having a base electrode and emitter and collector electrodes defining a path therebetween, said base electrode comprising said control electrode and said path between said emitter and collector electrodes comprising said conduction path.

12. In an a-c to d-c conversion circuit of the type including
  first and second charge storage means, each having respective first and second terminals;
  means for applying a a-c voltage, as referred to a reference potential, to the first terminal of said first charge storage means,
  unidirectionally conductive means for selectively completing a connection between the second terminal of said first charge storage means and said reference potential such that said first charge storage means is supplied charge by excursions of said a-c signal in a sense to be conducted by said unidirectionally conduction means;
  and means for transferring charge from said first to said second charge storage means during intervals when said first charge storage means is not being supplied charge, thereby developing an output voltage across said second charge storage means, the improvement wherein:
  said unidirectionally conductive means include a voltage controlled switch responsive to control signal applied thereto, and
  wherein said voltage source further includes feedback means, responsive to said output voltage for generating said control signal.

* * * * *